March 18, 1924.
D. S. DE LAVAUD
ROTARY CASTING
Filed May 22, 1919
1,486,951
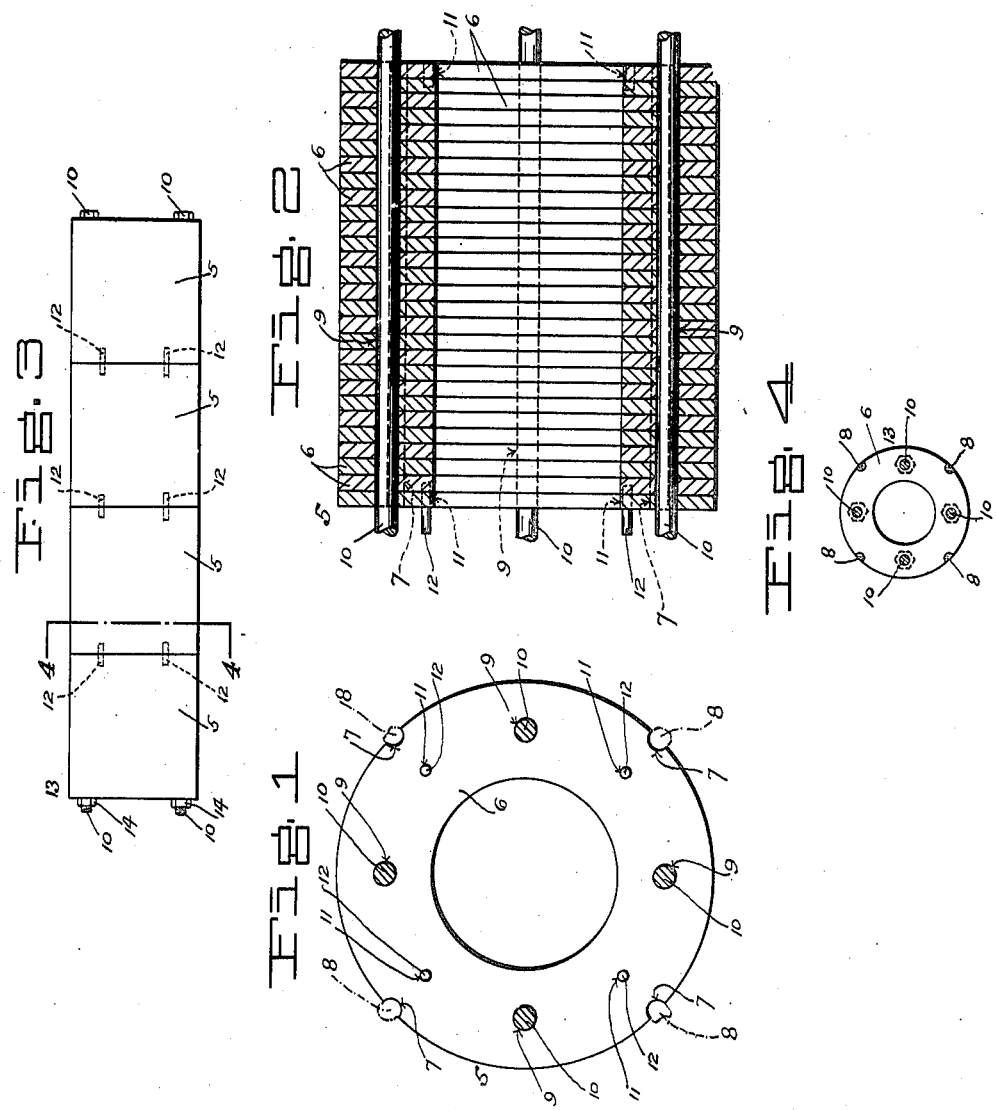
INVENTOR
Djimitri SEnsaud de Lavaud
BY
Augustus M. Henry,
ATTORNEY Patented Mar. 18, 1924.

1,486,951

UNITED STATES PATENT OFFICE.

DIMITRI SENSAUD DE LAVAUD, OF NEW YORK, N. Y.

ROTARY CASTING.

Application filed May 22, 1919. Serial No. 298,885.

*To all whom it may concern:*

Be it known that I, DIMITRI SENSAUD DE LAVAUD, a citizen of the United States of Brazil, and resident of New York, in the county of New York and State of New York, have invented certain new and useful Improvements in Rotary Casting, of which the following is a specification.

This invention relates to the art of rotary casting, and more particularly aims to provide an improved mould, formed of lamellar components such as disclosed and defined in U. S. Letters Patent to me No. 1,329,754.

In such patent, a mould formed of transverse ring-shaped lamellar components is broadly described and claimed; the specific embodiment illustratively shown including means for tying several components or laminæ together, to maintain the mould integrity and at the same time to permit slight lateral distortions of the mould to satisfy different heat expansions in different parts of the mould, such means consisting solely of longitudinal tie-bolts running lengthwise through the mould and passed through registering transverse holes formed in the laminæ.

The present invention provides a method of constructing such a mould, and a mould as thus constructed, which, while constituting a considerable departure from the said specific embodiment disclosed in said patent, and therefore claimed as such herein, falls within the scope of the broader claims of said patent. The specific embodiment illustratively disclosed herein has advantages over the specific embodiment disclosed in said patent, as will be seen from what follows; particularly in respect to increased convenience in handling the mould and mould parts both during the building of the mould and during handling of the mould and mould parts toward and in the casting machine and while removing the mould and mould parts therefrom, and increased convenience and economy of manufacture.

The present invention broadly involves the method of providing an elongated laminated mould of the kind above indicated, and such mould, characterized by the construction of the mould of a plurality of longitudinal sections, preferably readily separable, each section including a plurality of transverse ring-shaped laminæ arranged face to face, with the laminæ of each section permanently secured together, preferably by welding or an analogous securement, and with the sections held together by longitudinal tie-bolts passed through registering transverse holes in all the laminæ of all the sections. By the welding described, the laminæ of a section are more or less rigidly secured together, and yet so as to provide gas escape openings between the laminæ and perhaps permit a slight degree of lateral flexibility of such section; while the tie-bolts, when their nuts are suitably tightened, hold the mould sections in face to face relation with their axes aligned and yet permit the sections to have slight lateral readjustments relative to each other to compensate for unequal heat expansions and so permit the mould to be rotated without noticeable vibration or any chance of injury.

The different laminæ of each section are preferably welded together by slotting such laminæ when arranged in a stack similar to the stack which they will present when finally formed into a section, such slots being arranged on the outer periphery of the section and running parallel to the axis of the section and being spaced circumferentially around the section, and by filling the slots with a metal delivered thereto in a molten state in connection with the performance of the welding operation. If the welding is performed as just described, it is clear that gas escape openings are provided between contiguous laminæ and between adjacent points of welding; although of course it will be understood that in constructing the mould of the present invention, the laminæ of a section may be otherwise welded, if welded. For example, if such welding be on the line of a closed curve, as along the outer peripheral margins of the laminæ, advantage may be taken of the tie-bolt construction shown in U. S. Letters Patent to me No. 1,323,252, to permit the escape of the gases which might otherwise be trapped as the result of the welding last described; in other words, it may be convenient to provide for the escape of such gases by way of the transverse holes in the laminæ through which are passed the tie-bolts, simply by making such holes of greater cross-sectional area than the cross-sectional area of the tie-bolts.

In carrying out the invention, it is preferable to provide means, in connection with the sections, and additional to the tie-bolts, for maintaining the sections substantially coaxial when arranged in face to face relation, said means including one or more projections on the end of one section and one or more accommodating recesses on the end of an adjoining section.

The invention will be more clearly understood from the following description, when taken in connection with the accompanying drawing showing the preferred embodiment above referred to.

In this drawing,

Fig. 1 is a transverse section, taken through the mould, and showing one of the mould-sections in end elevation;

Fig. 2 is an axial section of the mould-section shown in Fig. 1, the top and bottom tie-bolts being shown in elevation, and the tie-bolts being broken away beyond the limits of the mould-section;

Fig. 3 is a side elevation of a mould formed of several mould-sections arranged in face to face relation; and Fig. 4 is a transverse section, taken on the line 4—4 of Fig. 3.

The process of the present invention will be more clearly understood if disclosed and explained in connection with the following structural description.

Referring to Figs. 1 and 2, each mould-section 5 is formed of a plurality of annular laminæ 6. These laminæ, when arranged in a stack as shown, are slotted to provide grooves as indicated at 7. The sections are then welded together adjacent to the parts of the laminæ thus slotted. The grooves are filled to overflowing, as indicated at 8 in Fig. 1, with a suitable metal, employed in the course of the welding operation in the familiar way. The laminæ are now joined together by welding, at points spaced circumferentially around the outside periphery of the mould section.

The laminæ may conveniently be formed of metal stampings, or in any other desired manner; but in any event it is preferred not to waste time to machine their inner and outer peripheries to make the different laminæ absolute duplicates, before the welding step just described.

After the laminæ are welded together, as indicated at 8, the section is finally machined to the desired interior and exterior conformations, as by turning the outside and boring the inside; such conformations here being cylindrical and concentric. The metal seated in the groove 7 of Fig. 1 during the welding step, as indicated at 8 in Fig. 1, is smoothed off, as indicated at 8 in Fig. 4, to which momentary reference may be had, during the turning operation.

The mould-section 5 of Figs. 1 and 2, preferably at the point in its manufacture, following the welding step, is provided with holes 9, to accommodate tie-bolts 10, to be run through all the mould-sections forming a complete mould as below described.

Each mould-section is also subjected to a drilling operation to provide at opposite ends sets of recesses 11. These recesses are provided to receive metal dowel pins 12 or the like, such pins to be set in the recesses at one end of each section and to project therefrom as shown in Fig. 2. The ends of the dowels seated in the recesses of a mould-section before such section is brought into face to face relation with another section, may be permanently set in place, as by sweating or the like, but the protruding ends of such dowel are preferably so formed as to be readily removable from accommodating recesses in another mould-section. These dowels and recesses, as will be seen from a momentary reference to Fig. 3, are one example of means carried by the mould-sections and including a projecting part on one section and an accommodating recess on the adjoining section, whereby the sections may be maintained substantially coaxial, when arranged in face to face relation, before applying tie-bolts 10 as below described.

Referring now to Figs. 3 and 4, a plurality of mould-sections 5 are aligned and arranged face to face, to constitute an elongated mould 13. To simplify the disclosure the lines of demarcation between the different laminæ are not shown in Fig. 3. The tie-bolts 10 are then passed through the holes of the mould-sections, and nuts 14 are mounted and turned on the protruding threaded ends of the bolts, until the mould sections are drawn and held together under lengthwise pressure such that the mould may be rotated as one cylindrical unit in any of the ways well known in the art, and yet such that slight lateral distortions of the mould may occur due to uneven heat expansions during casting.

I claim,

1. A rotary mould, comprising, a plurality of thin metallic rings arranged face to face and welded together at spaced intervals.

2. A rotary mould, comprising, a plurality of thin metallic rings arranged face to face and having the peripheral edges welded together at spaced intervals.

3. A rotary mould, comprising, a plurality of thin metallic rings arranged face to face, the mould periphery being slotted longitudinally at spaced intervals, and tie members located in said longitudinal slots and welded to the rings.

4. A mould as described in claim 1 in which the welded rings are grouped to form a plurality of longitudinal sections, tie bolts being passed through said sections from end to end of the mould.

5. A mould as described in claims 1 and 3 in which the sections are provided with dowel pins at one end and holes in the opposite end to receive the dowel pins of the abutting section.

6. The process of constructing a laminated mould consisting in placing a plurality of ring-shaped laminæ face to face to form a stack, slotting the periphery of the stack longitudinally at circumferentially spaced intervals, welding the laminæ together by filling the slots with metal, and machining the inner and outer surfaces of the stack to true cylindrical coaxial form.

Signed at New York, in the county of New York and State of New York, this 17th day of May A. D. 1919.

DIMITRI SENSAUD DE LAVAUD.